United States Patent
Takayama et al.

(10) Patent No.: US 6,917,804 B2
(45) Date of Patent: Jul. 12, 2005

(54) HIGH-SPEED ROAMING METHOD OF WIRELESS LAN

(75) Inventors: Takashi Takayama, Tokyo (JP); Kiyotaka Sato, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 562 days.

(21) Appl. No.: 09/901,134

(22) Filed: Jul. 10, 2001

(65) Prior Publication Data

US 2002/0025810 A1 Feb. 28, 2002

(30) Foreign Application Priority Data

Jul. 11, 2000 (JP) .................................... P 2000-209784

(51) Int. Cl.$^7$ .............................................. H04Q 7/20
(52) U.S. Cl. .................. 455/432.1; 455/432.2
(58) Field of Search .............................. 455/403, 432.1, 455/432.2, 432.3, 434, 43; 370/338, 329

(56) References Cited

U.S. PATENT DOCUMENTS 5,790,536 A   8/1998  Mahany et al. ............ 370/338
5,875,186 A   2/1999  Belanger et al. ............ 370/331
6,332,077 B1 * 12/2001  Wu et al. ................. 455/432.1

FOREIGN PATENT DOCUMENTS

JP    2001-94572    4/2001   ................. 370/254

OTHER PUBLICATIONS

U.S. Appl. No. 09/785,567, filed Sep. 2001, Peter Balogh.*

* cited by examiner

Primary Examiner—Nay Maung
Assistant Examiner—Angelica M. Perez
(74) Attorney, Agent, or Firm—McGinn & Gibb, PLLC

(57) ABSTRACT

All access points are operated synchronously, and monitor the beacon to mate with the hopping frequency of the neighboring access point. Accordingly, the station can grasp the up-to-date radio situation of the neighboring access point to be entered subsequently, and constructs the information as the database. As a result, when the beacon quality of the current subscription (connected) access point is reduced lower than the threshold value, the hopping channel and the hopping pattern are fitted to the neighboring access point having the best communication environment by referring the database, and then the subscription operation is applied directly.

23 Claims, 7 Drawing Sheets

HIGH-SPEED ROAMING METHOD OF WIRELESS LAN

BACKGROUND OF THE INVENTION

1. Technical Field of the Invention

The present invention relates to a high-speed roaming technology in the infrastructure type wireless LAN environment.

2. Related Art

Initially LAN (Local Area Network) is developed and utilized as the wire network. In recent years, the wireless LAN is developed and utilized in cooperation with the high communication speed and the progress of the mobile computing technology and the mobile terminal.

The wireless LAN is such a network system that a part of the wire LAN is constructed by the wireless system to incorporate the station into the LAN, and in many cases the Ethernet is employed as the wire LAN.

In this case, the station is normally the general term of PC having the FH-WLAN (Frequency Hopping-Wireless LAN) adaptor, and means the notebook PC into which the FH-WLAN card is inserted, the desktop PC which has the FH-WLAN•ISA (Industrial Reference Architecture) adaptor, or the like. In case the wireless LAN corresponds to the type that belongs to following ③, the station signifies the mobile station (terminal) that has the wireless terminal adaptor and exchanges the communication while moving.

As the wireless LAN, there are ① the wireless LANs which construct the closed network as the private network by them selves, ② the wireless LAN in which the access points (APs) to bridge the wireless terminal to the backbone network are provided as the network which is constructed to switch the terminal, that is connected to the existing wire LAN, to the wireless connection, and ③ the infrastructure type wireless LAN in which a plurality of access points are provided to enable the communication with the mobile terminal such as the portable terminal, etc. which has the wireless terminal adaptor.

In the infrastructure type wireless LAN in the above ③, in order to execute the roaming (this means to execute the switching of the communication connection from one access point to another access point herein) from one access point into which the station is subscribed to another access point, the station executes the operation (scanning) to find the access point into which the station can subscribe after such station transmits the probe request frame and then receives the probe response frame.

The normal scan contains two type scans in the default (set state), i.e., the active mode scan and the passive mode scan. First the active mode scan is carried out, and then the scanning mode is switched into the passive mode scan if the access point cannot be found within BSS (Basic Service Set) and then the passive mode scan is carried out. In case the access point cannot be found yet, the active mode scan and the passive mode scan are repeated.

In the above operation (scanning operation), since the U.S. band (frequency band) employs 79 channels from 2400.0 MHz to 2483.5 MHz, for example, all channels (79 channels at maximum) must be scanned to find the connectable access point. The roaming is carried out by transmitting the authentication request frame (the frame by which the station requests the authentication to enter into the access point (IEEE802.11)) from the station to the access point, that is connected for the first time based on the scan, and then receiving the authentication response frame, by which the access point authenticates the station, from the access point.

However, according to the above roaming system, the mobile station (referred simply to as a "station" hereinafter) secedes from the present access point, then scans all connectable access points, and then performs the subscription procedure to the access point having the maximum RSSI (Receive Signal Strength Indicator). As a result, a total time required for the roaming is extremely extended from 1 second at minimum to 13 seconds at maximum. This means that the time to disconnect the communication with the station is expanded, and thus this puts the very serious problem to the AGV (Automatic Guided Vehicle), etc. that is desired to be always controlled since the station is moving.

Therefore, in the Japanese Patent Application No. Hei 11-268657, the applicant of this application has proposed the high-speed roaming method in which the roaming function is started after the beacon quality is reduced smaller than the threshold value, then their radio situations are compared with each other by scanning the access points that are registered as the neighboring access point, and then the subscription operation is carried out in synchronism with the access point having the best communication environment.

More particularly, in this high-speed roaming method, first it is checked by searching the memories whether or not the hopping information of the registered neighboring access points, that are saved and registered in the access point into which the station is currently subscribed, has been gotten (downloaded). In the case that the hopping information has been downloaded, when the beacon quality of the access point into which the station is currently subscribed (connected) is reduced below the threshold value, the hopping channel, the hopping pattern, and the TSF time are fitted to the neighboring access point via the wireless MAC controller based on the acquired hopping information, and then the probe request frame is transmitted to the directly neighboring access point to monitor the beacon RSSI.

The probe response frame that is sent from the access point in response to this request is received, then the access point having the highest RSSI out of the monitored RSSIs is decided as the roaming access point (i.e., the subscription access point), and then the authentication request frame is transmitted to the access point via the wireless MAC controller. When the authentication response frame is received from the access point, that has transmitted the authentication request frame, via the wireless MAC controller, the subscription access point is switched to the access point as the authentication request sending destination (=authenticator).

According to such operation, the station can download the hopping information of the neighboring access point from the access point to which the station is now connected (subscribed). Therefore, the access point having the highest RSSI is selected from the neighboring access points in a short time based on the hopping information that is downloaded when the beacon quality is lowered below the threshold value, and thus such access point can be decided as the roaming destination.

[Problems to be Solved]

However, according to the high-speed roaming method set forth in the Japanese Patent Application No. Hei 11-268657, before the operation is shifted to the subscription operation, the roaming function is started after the beacon quality is lowered below the predetermined threshold value, then the access points that have been registered as the neighboring access points are scanned, then their radio situations are compared mutually, and then the subscription operation is synchronized with the access point that has the best communication environment. As a result, there is the problem such that the time is consumed until the subscription operation.

SUMMARY OF THE INVENTION

Therefore, it is an object of the present invention to provide a high-speed roaming method capable of executing the roaming in a very short time by applying immediately the subscription operation to the neighboring access point having the best communication environment at a point of time when the beacon quality of the connected access point is lowered below the threshold value.

[Means for Solving the Subjects]

In order to achieve the above object, the present invention provides a high-speed roaming method of a wireless LAN that comprises a network, a plurality of access points provided in the network, and a mobile terminal that is radio-connected to one of the plurality of access points via a communication system using a frequency hopping, each of the access points registers previously a predetermined number of access points out of respective neighboring access points as neighboring access points, sends out hopping information of its own access point periodically to the network at mutually different timings, and receives the hopping information of the neighboring access points out of respective access points to construct their own access points as a database, and synchronize all access points in a same subnet of the network and sends out radio beacons synchronously from the access points; and the mobile terminal monitors the radio beacons of a connected access point and downloads hopping information of the neighboring access points from the connected access point, monitors the radio beacons of the neighboring access points based on the hopping information, construct the monitored hopping information as a database to always compare radio environments, and select and connect the access point having a best radio situation by referring the database of the neighboring access points when a quality of the radio beacon of the connected access point is reduced lower than a predetermined value.

In above configuration, preferably each of the access points sets previously one access point of respective access points connected to the same subnet as a master access point and sets the access points other than the master access point as slave access points, the master access point sends out a master beacon containing time information to the network at a predetermined time interval, and the slave access points are operated in synchronism with the master access point by receiving the master beacon and comparing time information contained in the master beacon with its own time information to correct. In this case, preferably another access point connected to the same subnet backups the master access point in place of the master access point when an operation of the master access point is stopped because of a predetermined reason.

Also, preferably the mobile terminal is connected subsequently to the access point having a second best radio situation when such mobile terminal is not connected to the access point having a best radio situation.

Also, preferably the mobile terminal is connected to the access point having a good communication situation by scanning all frequency channels when such mobile terminal is not connected to all neighboring access points.

Also, preferably the mobile terminal is connected to the access point having a best communication situation, by scanning all connectable access points out of the access points provided in the network at a rising time.

DETAILED DESCRIPTION OF THE PREFERRED EMBODIMENTS

[Embodiments of the Invention]

Embodiments of the present invention will be explained in detail with reference to the accompanying drawings hereinafter.

[Structural Example of the Wireless LAN]

Figure 1:
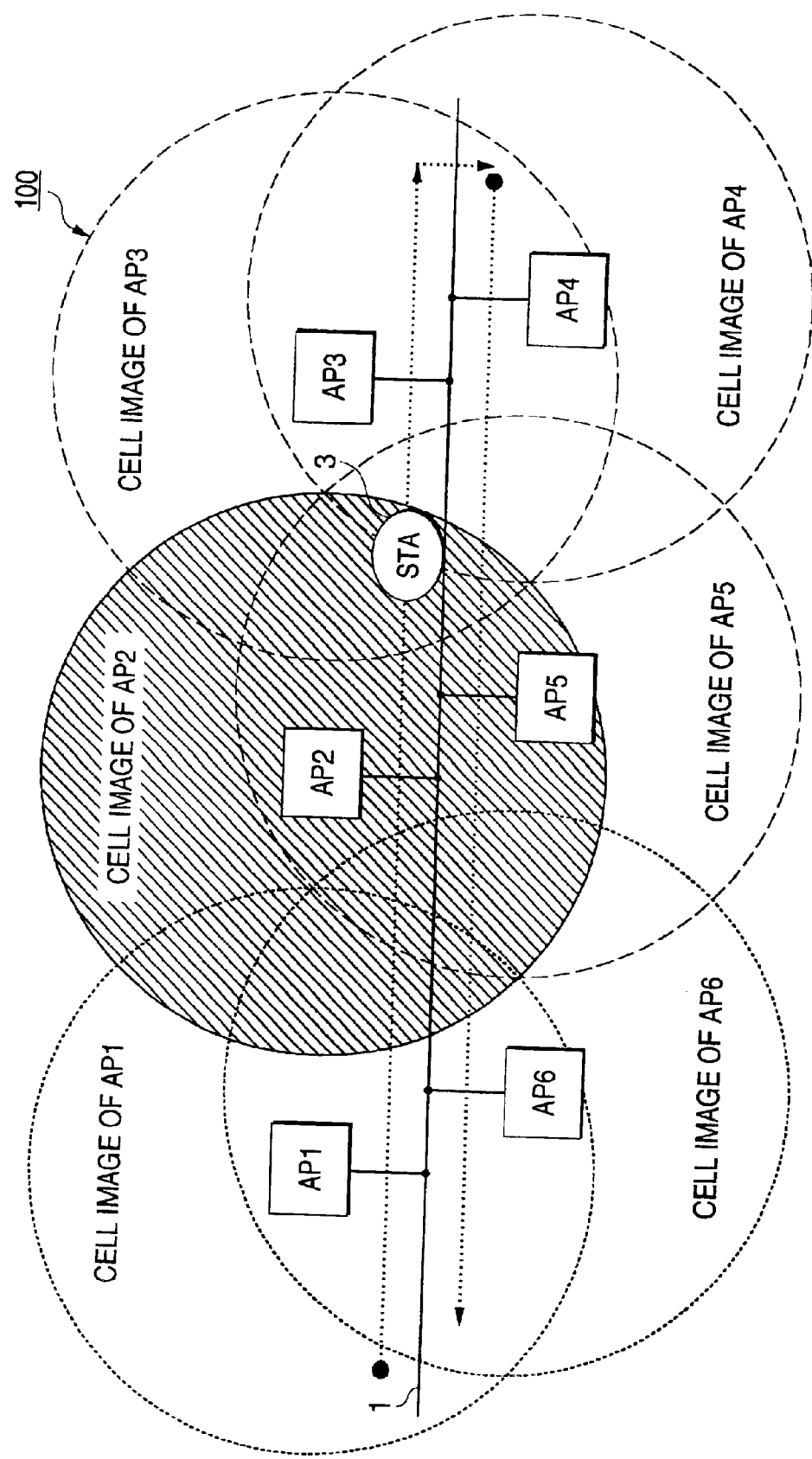
FIG. 1 is a schematic view showing an embodiment of a wireless LAN to which a high-speed roaming method of the present invention can be applied.

FIG. 1 is a schematic view showing an embodiment of a wireless LAN to which a high-speed roaming method of the present invention can be applied. In FIG. 1, an Ethernet 1, a plurality of access points AP1, AP2, . . . , AP6 provided in the Ethernet 1, and a station 3 that moves in the direction indicated by an arrow are shown as a wireless LAN 100 (One mobile station is shown in FIG. 1 but such station is not limited to this. A plurality of mobile stations may be employed).

Also, respective access points function as one type bridge between the Ethernet 1 and the station 3. Each access point receives the frame that is directed to the MAC (Media Access Control) address of the subsidiary station 3 from the IEEE802.3 (reference specification) frame transmitted from the backbone Ethernet, then converts such frame into the frame of IEEE802.3 specification, and then transmits the frame to the destination station. Also, the frame transmitted from the subsidiary station 3 is sent out to the backbone (Ethernet 1) in the reverse procedures.

In this case, circles shown as a cell image of the access point AP1, a cell image of the access point AP2 . . . in FIG. 1 signify radio zones (in this case, micro cells each having a radius of several tens meter to several hundreds meter) of the access points AP1, AP2, . . . respectively. Also, the cell image of the shaded access point AP2 shows the cell relationship overlapped with the neighboring access points AP1, AP3, . . . , AP6 in case the attention is paid to the access point AP.

[Structural Example of the Access Point]

Figure 2:
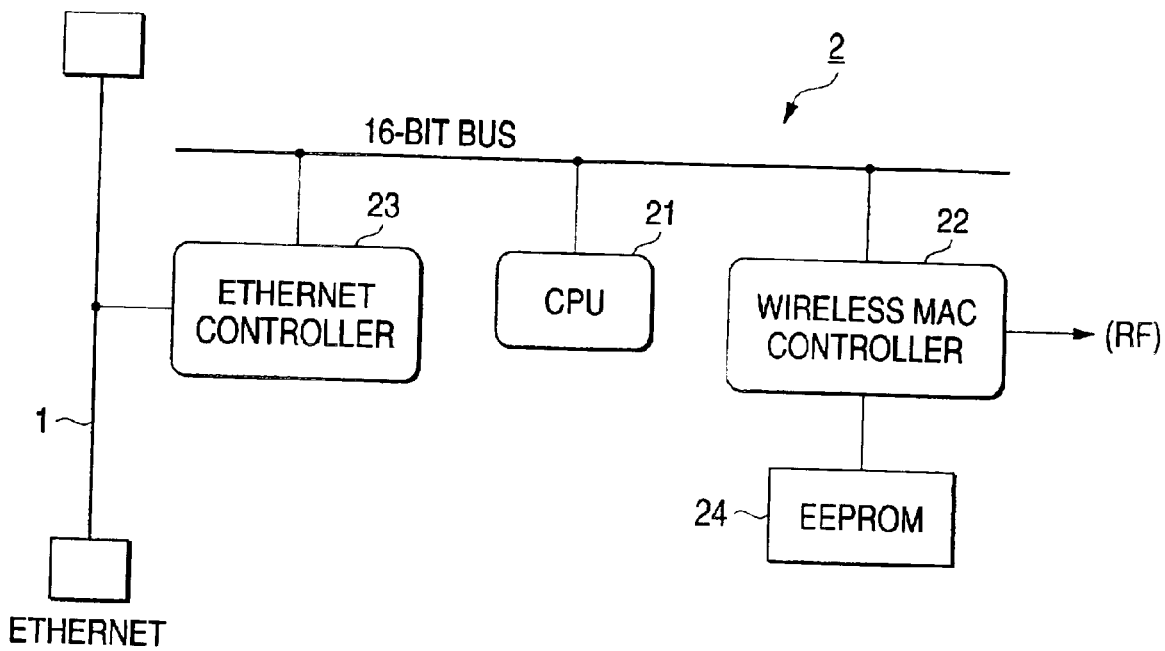
FIG. 2 is a block diagram showing a structural example of an access point.

FIG. 2 is a block diagram showing a structural example of the pertinent portion of each access point. An access point 2 comprises a CPU 21, a wireless MAC controller 22, an Ethernet controller 23, and an EEPROM 24.

The CPU 21 executes the control of the overall access point 2. Also, this CPU 21 controls the transmitting timings of the hopping information of the access point 2 and the information of the neighboring access points to the Ethernet so as to enable the high-speed roaming operation according to the present invention, stores and updates the hopping information of the neighboring access points, etc. by respective means (programs) stored in the EEPROM 24, and controls the execution of the roaming operation.

The wireless MAC controller 22 has both a data service function for the MAC layer and the PHY layer (Physical Layer) via the radio and a management function to control them. This wireless MAC controller 22 transmits/receives the frame via the PHY layer, and executes the control of the radio media and the data transmission/reception.

The Ethernet controller 23 has a function for controlling the PHY layer in the wire portion. This Ethernet controller 23 transmits/receives the frame via the PHY layer, and executes the data transmission/reception to/from the Ethernet 1 and the transmission/reception control.

The EEPROM 24 stores means (programs) for storing and updating the hopping information of the neighboring access points, etc. and executing the roaming operation, four neighboring access points registered in advance by using NMS (Network Management System) at maximum (e.g., channels or identification information of four neighboring access points at maximum), the initial values necessary at the time of starting, and others.

Also, each access point has the not-shown memory (DPAM, the flash memory that can store and read the data by installing the removable memory medium, FD, the magnetic disk, the optical disk, or the like), and stores the hopping information of the registered neighboring access points, etc.

[Structural Example of the Station]

Figure 3:
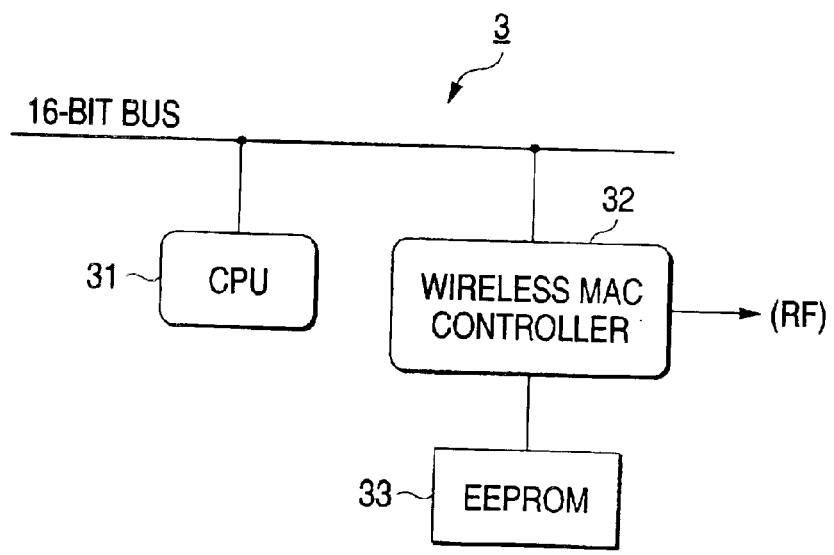
FIG. 3 is a block diagram showing a structural example of a station.

FIG. 3 is a block diagram showing a structural example of the station. In the present embodiment, the station signifies the mobile station (mobile terminal) that has the wireless terminal adaptor and exchanges the communication while moving. This station 3 comprises a CPU 31, a wireless MAC controller 32, and an EEPROM 33.

The CPU 31 executes the control of the overall station 3. Also, this CPU 31 controls the download of the neighboring access points from the subscription access point, the decision of the roaming destination, etc., based on respective means (programs) stored in the EEPROM 33 to execute the high-speed roaming operation according to the present invention.

The wireless MAC controller 32 has both a data service function for the MAC layer and the PHY layer (Physical Layer) via the radio and a management function to control them. This wireless MAC controller 32 transmits/receives the frame via the PHY layer, and executes the control and management of the radio media and the data transmission/reception.

The EEPROM 33 stores means (programs) for executing the high-speed roaming operation according to the present invention, the constants, etc.

Also, the station 3 has the not-shown memory (DRAM, the flash memory that can store and read the data by installing the removable memory medium, FD, the magnetic disk, the optical disk, or the like), and stores the hopping information of the neighboring access points, that are downloaded from the subscription access point.

[Feature of the High-speed Roaming Method]

A feature of the high-speed roaming method according to the present invention resides in that, in the infrastructure type wireless LAN environment that the wireless LAN enters/secedes into/from the access point being selected successively with the movement of the station, all access points in the same ESS ID (Extended Service Set ID: the same ESS ID in the wireless network is referred to as the "same domain" hereinafter) connected on the same subnet via the wires are operated synchronously.

For this reason, one access point is set previously as the master among respective access points that are connected to the same subnet (subnet having the same network address in the wire network), and then a reference signal that is needed to take the synchronization by the access point in the same subnet is generated. The access point for generating such signal is called the master access point (referred simply to as a "master AP" hereinafter). This master AP broadcasts a reference signal containing TSF (Time Synchronization Function) time information serving as a reference to take the synchronization of the access point periodically (referred to as a "master beacon" hereinafter) to the connected wire Ethernet network.

The master beacon transmitted from the master AP is received by the access points other than the master AP (referred to as a "slave AP" hereinafter). The slave AP operates in synchronism with the master beacon transmitted from this master AP. Accordingly, all access points of the same domain in the same subnet operate synchronously.

Also, all access points broadcast periodically their own hopping information such as the hopping pattern, the hopping set, the TSF time, etc. (referred to as an "ETH-BEACON frame" hereinafter) to the wire Ethernet network. In this case, the ETH-BEACON frame is a special frame for the high-speed roaming operation of the present invention (this means the beacon frame that flows through the Ethernet), and is a multicast frame that is used by the access points on the wire side to know the information mutually.

In addition, the access point has previously a function for deciding and registering a predetermined number of access points, into which the station must subscribe subsequently, as the neighboring access point. Also, the individual access point as a function for receiving the hopping information transmitted from the registered access point and then constructing/updating the database of its own access point.

In contrast, the station can download the information of the neighboring access points from the connected access point to hold the information of the neighboring access points registered in the current subscription access point.

The station monitors the radio beacon of the connected access point and also monitors the radio beacon of the neighboring access points based on the downloaded information of the neighboring access points. As a result, even when the station is moving, such station can grasp the RSSI value of the radio beacon of the access point registered as the neighboring access point and its quality, while being connected to one access point. Also, if the information are formed as the database to always compare the radio environments mutually, the station itself can always grasp the neighboring access points that have the good communication condition.

When the beacon quality of the connected access point is lowered smaller than the threshold value, the station starts the roaming function and then applies directly the subscription operation to the access point having the best communication condition among the access points, that are registered as the neighboring access points, without the scanning of the frequency channels. Here the subscription operation signifies a series of operations such as transmission/reception of the probe request frame and the probe response frame, transmission/reception of the authentication request frame and the authentication response frame, transmission/reception of the association request frame and the association response frame, etc. between the station and the access points (IEEE802.11 term).

In addition, if the station cannot enter into the access point having the best communication condition out of the access points registered in the neighboring access points by referring to the database of the station, such station executes the subscription operation sequentially into the access point having the second best communication condition by referring to the database.

As the result of the subscription operation into all neighboring access points, if the station cannot enter into the access point at all, such station scans all frequency channels (i.e., executes the normal scanning). Accordingly, the station can be connected to the access point having the good communication situation.

Also, at the rising time when the station does not fetch the information of the neighboring access points yet, the station scans the predetermined frequency channels and is connected to the access point having the best communication environment.

In case the master AP is stopped because of any reason, another access point has a backup function in place of the master AP. Therefore, it maybe thought of, for example, that a second master AP (referred to as a "backup AP" hereinafter) is set in the access point itself, the one and only access point out of the slave APs is caused to back up the master AP, etc. In this case, the access point having the smallest hopping set number is started as the backup AP. However, the backup AP is not limited to this condition. For example, the backup AP may be decided based on the set Alias name, the backup AP may be decided based on MAC ID, or the like.

[Operation of the Access Point for the High-speed Roaming]

1. Synchronizing Method

Figure 4:
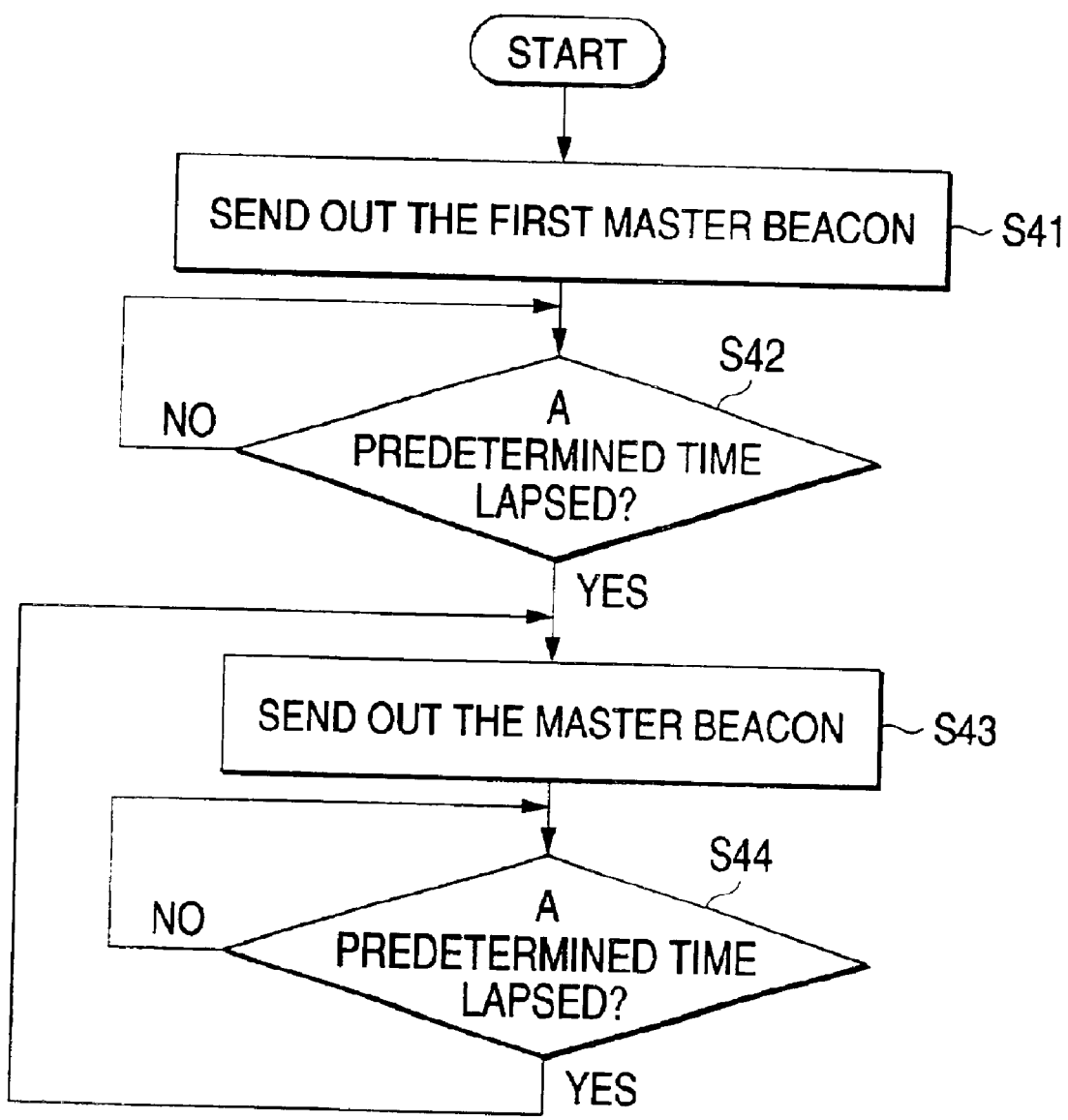
FIG. 4 is a flowchart showing an operational example of a master AP as a synchronization reference.
Figure 5:
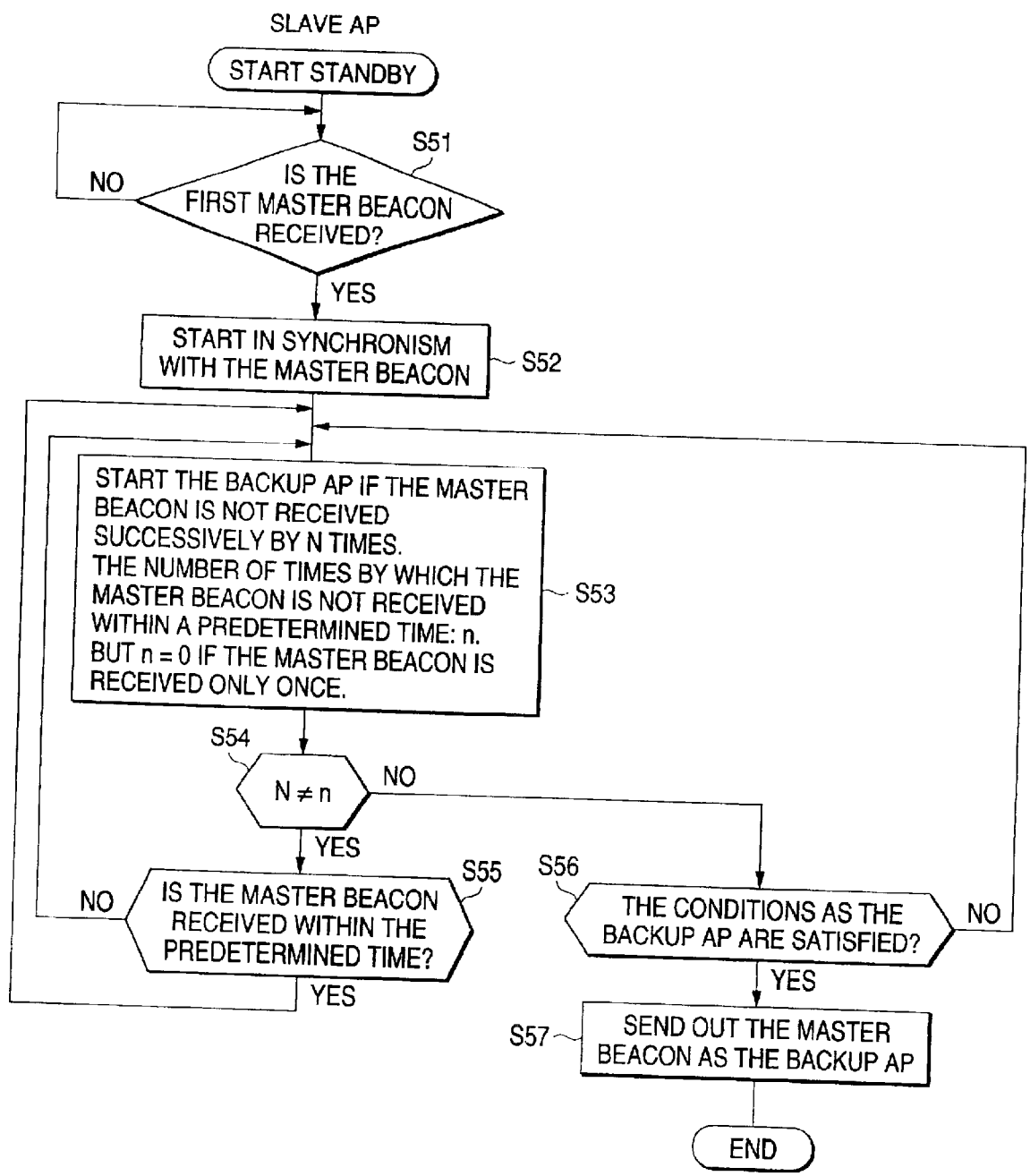
FIG. 5 is a flowchart showing an operational example of a slave AP that operates in synchronism with the master AP.

FIG. 4 and FIG. 5 are flowcharts showing operational examples in which all access points in the same subnet are operated synchronously. FIG. 4 is a flowchart showing an operational example of the master AP as the reference of synchronization. FIG. 5 is a flowchart showing an operational example of the slave AP that operates in synchronism with the master AP.

As shown in FIG. 4, in the master AP, the CPU 21 immediately sends out the first master beacon to the Ethernet networks via the Ethernet controller 23 at the time of start to cause the access points to synchronize with each other (step S41). Then, it is decided whether or not a predetermined time has lapsed (step S42). If it is decided that the predetermined time has lapsed (if YES in the decision in step S42), the master AP broadcasts the master beacon to the Ethernet networks via the Ethernet controller 23 (step S43). These operations are repeated periodically at a predetermined time interval (step S43, step S44).

In contrast, as shown in FIG. 5, in the slave AP, it is decided in the start standby state whether or not the first master beacon is received from the master AP (step S51). If it is decided that the first master beacon is received (if YES in the decision in step S51), the slave AP is started in synchronism with the master beacon (step S52). As described above, the master beacon is transmitted from the master AP periodically at the predetermined time interval. In this case, if the master AP is stopped because of any reason, there is the case where the master beacon cannot be received by the slave AP side. Therefore, if the master beacon is not received successively by N times, the number of times n by which the master beacon is not received within a predetermined time is counted so as to start the backup AP (step S53). Then, the number of times n by which the master beacon is not received is compared with a predetermined successive number of times N (step S54). If the number of times n by which the master beacon is not received is not equal to the successive number of times N (in other words, if the master beacon is received only once within the predetermined time) (if YES in the decision in step S54), the slave AP monitors the master beacon transmitted from the master AP (step S55) and then repeats the operations in step S53 and subsequent steps.

In contrast, if the number of times n by which the master beacon is not received is equal to the successive number of times N (if NO in the decision in step S54), it is decided whether or not the slave AP can satisfy the conditions as the backup AP (step S56). The conditions as the backup AP mean the conditions such that, as described above, the access point has the smallest hopping set number, etc. If the slave AP can satisfy the conditions as the backup AP (if YES in the decision in step S56), the slave AP sends out the master beacon as the backup AP instead of the master AP (step S57). Unless the slave AP can satisfy the conditions as the backup AP (if NO in the decision in step S56), such slave AP repeats the operations in step S53 and subsequent steps.

In this fashion, since the master AP serving as the synchronizing reference sends out periodically the master beacon containing the TSF timing acting as the synchronizing reference signal to the Ethernet, the slave APs belonging to the same subnet are operated synchronously based on the information of the master beacon. Therefore, all access points in the same subnet can be operated synchronously. In contrast, if the master AP is caused not to function be cause of any reason, the slave AP acts as the backup access point based on the self-decision and then sends out the master beacon that is important for the present system. As a result, the trouble can be suppressed to the minimum.

2. Transmitting and Updating Operations of the Hopping Information

Figure 6:
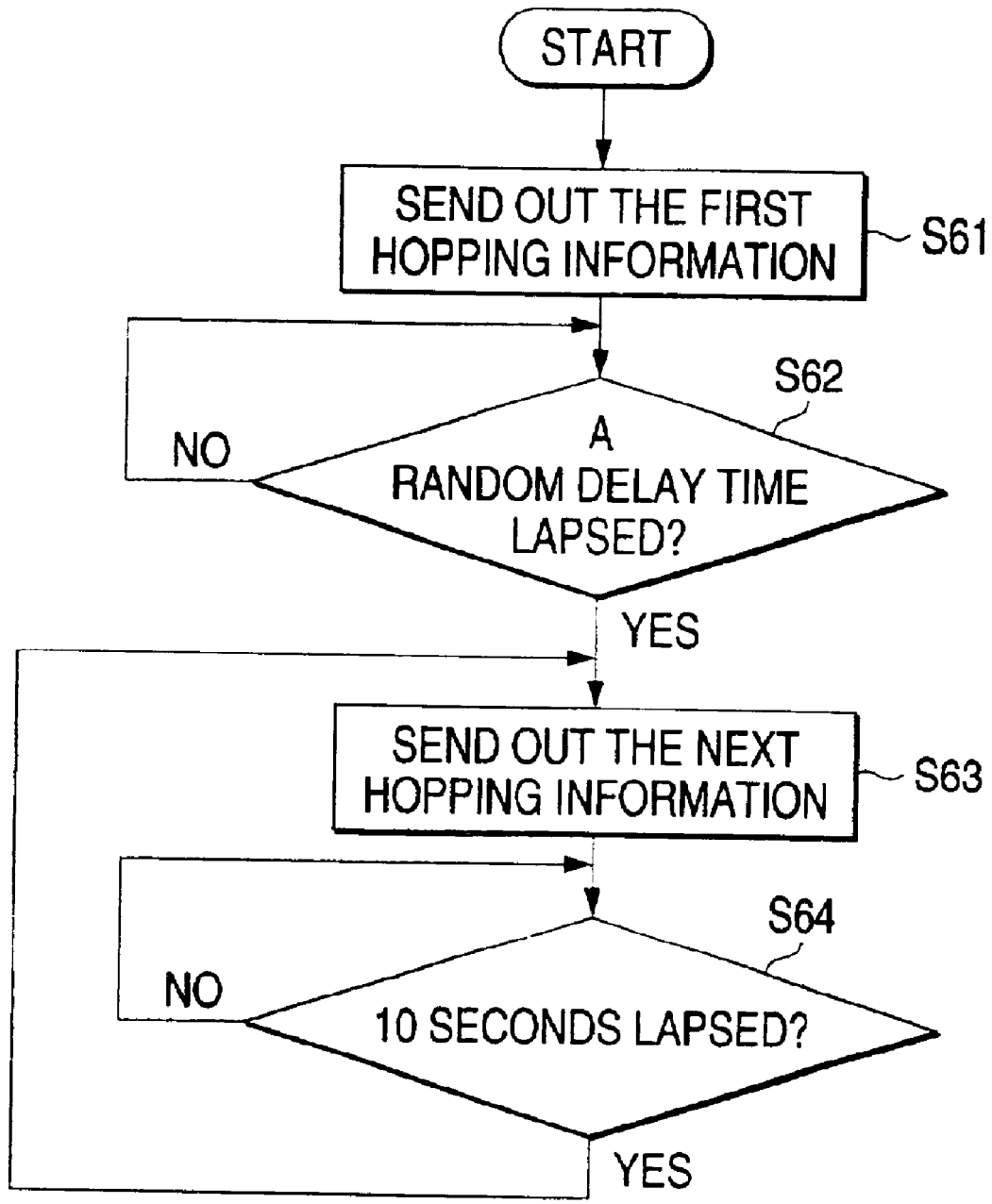
FIG. 6 is a flowchart showing transmitting and updating operations of the hopping information of each access point.
Figure 7:
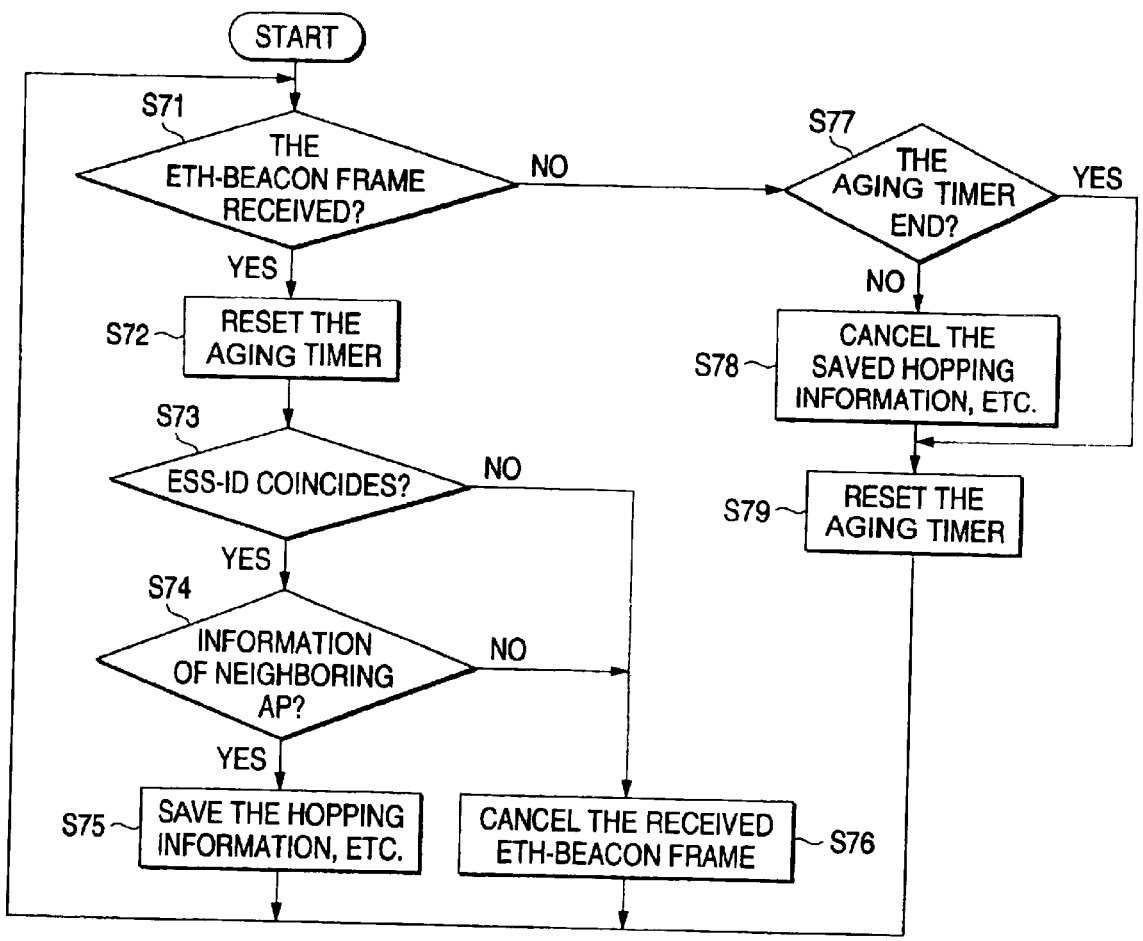
FIG. 7 is a flowchart showing receiving and updating operations of the hopping information of each access point.

FIG. 6 and FIG. 7 are flowcharts showing operational examples of each access point. FIG. 6 is a flowchart showing transmitting and updating operations of the hopping in formation of each access point. FIG. 7 is a flowchart showing receiving and updating operations of the hopping information of each access point. In this case, the operations in FIG. 6 and FIG. 7 can be carried out in parallel.

As shown in FIG. 6, at the time of starting the access point 2, the CPU 21 sends out immediately the ETH-BEACON frame containing the hopping information to the Ethernet 1 via the Ethernet controller 23 (step S61). Then, it is decided whether or not a random delay time (0 to 10 seconds in this embodiment) has lapsed (step S62). If it is decided that the random delay time has not lapsed (if NO in the decision in step S62), the decision in step S62 is repeated. If it is decided that the random delay time has lapsed (if YES in the decision in step S62), the CPU 21 sends out (the ETH-BEACON frame containing) the next hopping information to the Ethernet 1 via the Ethernet controller 23 (step S63). This operation is repeated at a predetermined time interval (10 seconds interval in the embodiment) (step S64). This random delay given after the transmission of the ETH-BEACON frame executed immediately at the time of starting is used to prevent the simultaneous start of the arranged access points or the simultaneous sending-out of the hopping information.

3. Receiving and Updating Operations of the Hopping Information

As shown in FIG. 7, the CPU 21 monitors whether or not the ETH-BEACON frame is received from the Ethernet 1 (step S71). If it is decided that the ETH-BEACON frame is received (if YES in the decision in step S71), the operation goes to step S72. If it is decided that the ETH-BEACON frame is not received (if NO in the decision in step S71), the operation goes to step S77.

If the CPU 21 receives the ETH-BEACON frame from the Ethernet 1 via the Ethernet controller 23 (if YES in the decision in step S71), it resets an ageing timer to a predetermined value (step S72). The predetermined value is set to 15 seconds in the embodiment, but it is not limited to this value.

When the CPU 21 receives the ETH-BEACON frame from the Ethernet 1 via the Ethernet controller 23, it compares the ESS-ID of the frame with its own ESS-ID (step S73) If the ESS-ID of the frame does not coincide with its own ESS-ID (if NO in the decision in step S73), the operation goes to step S76. If the ESS-ID of the frame coincides with its own ESS-ID, the operation goes to step S74.

If it is decided that both ESS-IDs coincide with each other (if YES in the decision in step S73), the CPU 21 compares sequentially the channel (each access point identification information) of the ETH-BEACON frame with the neighboring access point identification information (four pieces at maximum in this embodiment) stored in the EEPROM 24, to decide whether or not the frame is the information (containing the hopping information) of the registered neighboring access point (step S74). Then, if the ETH-BEACON frame is transmitted from the registered neighboring access point (if YES in the decision in step S74), the CPU 21 picks up the hopping information from the ETH-BEACON frame received via the Ethernet controller 23, and stores (saves) the hopping information in the memory (step S75). The operation is returned to step S71, and the operations in step S71 and subsequent steps are repeated. In contrast, if the ETH-BEACON frame is not transmitted from the registered neighboring access point (if NO in the decision in step S74), the operation goes to step S76.

If the ESS-ID of the received ETH-BEACON does not coincides with its own ESS-ID (if NO in the decision in step S73) or if the frame is not the ETH-BEACON frame that is not transmitted from the registered neighboring access point (if NO in the decision instep S74), the CPU 21 cancels the received ETH-BEACON frame (step S76). The operation is returned to step S71, and the operations in step S71 and subsequent steps are repeated. If the CPU 21 does not receive the ETH-BEACON frame (if NO in the decision in step S71), the CPU 21 decides whether or not the ageing timer is ended (step S77). If the timer value=0 (if YES in the decision in step S77), it is decided that the ageing timer is ended, and then the operation goes to step S79 to reset the ageing timer. If the timer value≠0 (if NO in the decision in step S77), the operation goes to step S78. In this case, the ageing timer value is decremented in compliance with the lapse of time.

If the access point fails to receive the ETH-BEACON frame (if NO in the decision in step S77) before the ageing timer is ended, the CPU 21 cancels the saved hopping information, etc. saved in the database (step S78).

Then, the CPU 21 resets the ageing timer (step S79). The operation is returned to step S71, and the operations in step S71 and subsequent steps are repeated.

According to the above operations, since the access points broadcast respective hopping information (the ETH-BEACON frames) periodically to the networks of the Ethernet (where the broadcast timings of respective access points are different.), all access points belonging to the same subnet can know mutually the information of the hopping patterns, the hopping sets, and the TSF times of other access points. Since respective access points receive the hopping information from other access point after this to update the information in its own database, they can exchange mutually the hopping in formation via the Ethernet as the result. Accordingly, respective access points can know the up-to-date and precise hopping information about all access points in the same subset.

[Operation of Station for High-speed Roaming]

1. Download of the Hopping Information

The station downloads the hopping information of the neighboring access pointes saved in the subscription access point. The station can get the hopping information of up to four access points being provided around the current subscription access point by the downloading. Also, the station enters into the access point having the maximum RSSI at the rising time by the normal scanning.

2. Operational Example of the High-speed Roaming

Figure 8:
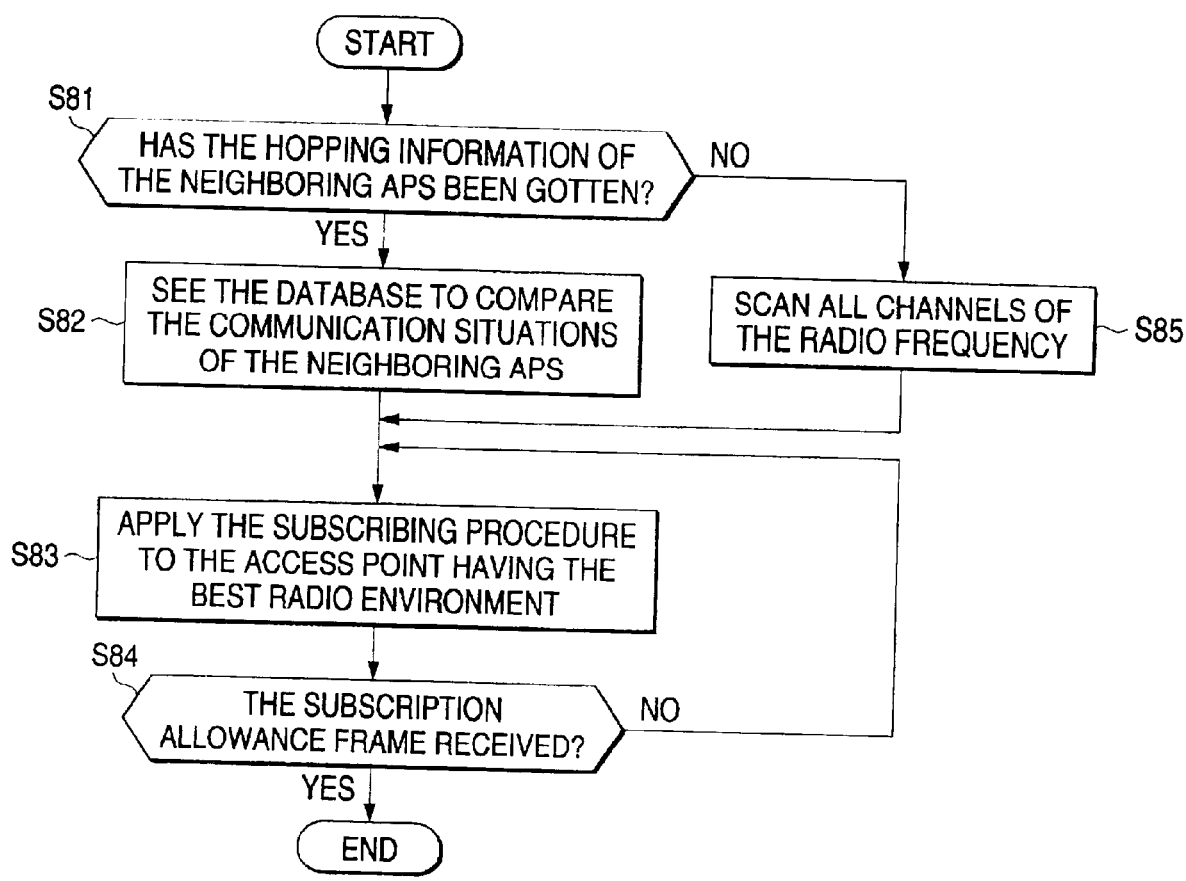
FIG. 8 is a flowchart showing an example of the high-speed roaming operation of the station.

FIG. 8 is a flowchart showing an example of the high-speed roaming operation of the station 3.

First, the CPU 31 searches the memory to check whether or not the hopping information of the registered neighboring access points that are saved and registered in the current subscription access point has been gotten (downloaded) (step S81).

If it is decided that the hopping information has been gotten (if YES in the decision in step S81), the CPU 31 monitors the beacon to mate with the hopping frequency of the neighboring access point since all access points are operated synchronously. Accordingly, the station can grasp the latest radio situation of the neighboring access point into which the station is entered subsequently and also forms the information as the database. Therefore, when the beacon quality of the current subscription (connected) access point becomes smaller than the threshold value, the station can see the database (step S82). Thus, the station fits the hopping channel and the hopping pattern to the neighboring access point having the best communication environment via the wireless MAC controller 32, then transmits the probe request frame, then receives the response frame (probe response frame) sent from the access point in response to the request made by the probe request frame, then decides the access point (subscription access point) as the roaming destination, and then transmits the authentication request frame (authentication request (subscription request)) to the access point via the wireless MAC controller 32.

When the CPU 31 receives the authentication response frame (authenticated (=subscription allowance)) from the access point, that transmits the authentication request, via the wireless MAC controller 32, such CPU 31 switches the subscription access point into the access point as the authentication request sending destination (authenticator) (step S84).

If the hopping information is not downloaded (if NO in the decision in step S81), the CPU 31 scans all channels of the radio frequency via the wireless MAC controller 32 at the time of rising the station, for example (step S85). Then, the operation goes to step S83.

In this manner, when the beacon quality of the current subscription (connected) access point is reduced below the threshold value, the subscription operation can be applied directly to the access point, that has the best communication situations, out of the neighboring access points only by mating the hopping channel and the hopping pattern by referring the database. Accordingly, the roaming can be carried out in a very short time.

Also, the station can be connected to the access point having the good communication environment by the normal scanning at the time of rising the station. As a result, even when the station rises at any place of the wide-area network in which a plurality of access points are provided, such station can self-decide the roaming destination and thus can enter into the optimum access point in a very short time.

With the above, one embodiment of the present invention is explained. But the present invention is not limited to the above embodiment, and it is needless to say that various modifications may be implemented.

[Advantages of the Invention]

As described above, according to the high-speed roaming method of a wireless LAN of the present invention, since the master AP acting as the synchronization reference sends out periodically the master beacon containing the TSF timing information serving as the synchronization reference to the Ethernet, the slave APs in the same subnet are operated in synchronism with the information of the master beacon. Accordingly, all access points in the same subnet can be operated synchronously.

Also, when the station enters into the access point, such station can download the neighboring access points and the hopping information from the access point. The station can monitor the radio beacon of the neighboring access points by changing the frequency channel in a moment based on the information. Therefore, the station can grasp the up-to-date radio situation of the neighboring access point to be entered next and also can compare the information as the database.

Therefore, when the beacon quality of the connected access point is reduced below the threshold value, the subscription operation can be applied directly to the access point, that has the best communication environment at that time, by referring the database without the matching of the frequency scan and the synchronization.

Also, the station can be connected to the access point having the good communication environment by the normal scanning at the time of rising the station.

According to this method, the station can self-decide the roaming destination and thus can enter into the optimum access point even when the station rises at any place of the wide-area network in which a plurality of access points are provided.

Further, if the master AP is caused not to function because of any reason, the access point acts as the backup access point based on the self-decision and then the backup means for sending out the master beacon that is important for the present system is provided. Thus, the trouble can be suppressed to the minimum.

What is claimed is:

1. A high-speed roaming method of a wireless LAN comprising:
    a network;
    a plurality of access points provided in the network; and
    a mobile terminal that is radio-connected to one of said plurality of access points via a communication system using a frequency hopping,
    wherein each of said access points:
        registers previously a predetermined number of access points out of respective neighboring access points as neighboring access points;
        sends out hopping information thereof periodically to the network at mutually different timings;
        receives the hopping information of the neighboring access points out of the respective neighboring access points to construct a database; and
        synchronizes all of said access points in a same subnet of the network and sends out radio beacons synchronously from said access points; and
    wherein said mobile terminal:
        monitors said radio beacons of a connected access point and downloads hopping information of the neighboring access points from said connected access point;
        monitors radio beacons of said neighboring access points based on the hopping information;
        constructs the hopping information as a mobile terminal database to continuously compare radio environments; and
        selects and connects an access point having a best radio situation by referring the mobile terminal database of said neighboring access points when a quality of the radio beacon of said connected access point is reduced lower than a predetermined value,
    wherein, when said mobile terminal is not connected to said access point having said best radio situation, said mobile terminal is connected subsequently to an access point having a second best radio situation.

2. The high-speed roaming method of a wireless LAN according to claim 1, wherein
    each of said access points sets one access point of said access points as a master access point, and sets the access points other than said master access point as slave access points,
    said master access point sends out a master beacon containing time information to the network at a predetermined time interval, and
    said slave access points are operated in synchronism with said master access point by receiving said master beacon and comparing time information contained in said master beacon with time information of each of said slave access points.

3. The high-speed roaming method of a wireless LAN according to claim 2, wherein
    when an operation of said master access point is stopped because of a predetermined reason, a backup access point connected to the same subnet backs-up said master access point in place of said master access point.

4. The high-speed roaming method of a wireless LAN according to claim 1, wherein
    said mobile terminal is not connected to all of said neighboring access points, said mobile terminal is connected to said access point having a good communication situation by scanning all frequency channels.

5. The high-speed roaming method of a wireless LAN according to claim 1, wherein
    said mobile terminal is connected to said access point having a best communication situation, by scanning all connectable access points out of said access points provided in the network at a rising time.

6. The high-speed roaming method of a wireless LAN according to claim 2, wherein
    when said mobile terminal is not connected to all neighboring access points, said mobile terminal is connected to said access point having a good communication situation by scanning all frequency channels.

7. The high-speed roaming method of a wireless LAN according to claim 3, wherein
    when said mobile terminal is not connected to all neighboring access points, said mobile terminal is connected to said access point having a good communication situation by scanning all frequency channels.

8. The high-speed roaming method of a wireless LAN according to claim 1, wherein
    when said mobile terminal is not connected to all neighboring access points, said mobile terminal is connected to said access point having a good communication situation by scanning all frequency channels.

9. The high-speed roaming method of a wireless LAN according to claim 2, wherein said mobile terminal is connected to said access point having a best communication situation, by scanning all connectable access points out of said access points provided in the network at a rising time.

10. The high-speed roaming method of a wireless LAN according to claim 3, wherein
said mobile terminal is connected to said access point having a best communication situation, by scanning all connectable access points out of said access points provided in the network at a rising time.

11. The high-speed roaming method of a wireless LAN according to claim 1, wherein
said mobile terminal is connected to said access point having a best communication situation, by scanning all connectable access points out of said access points provided in the network at a rising time.

12. The high-speed roaming method of a wireless LAN according to claim 4, wherein
said mobile, terminal is connected to said access point having a best communication situation, by scanning all connectable access points out of said access points provided in the network at a rising time.

13. The high-speed roaming method of a wireless LAN according to claim 5, wherein
said mobile terminal is connected to said access point having a best communication situation, by scanning all connectable access points out of said access points provided in the network at a rising time.

14. The high-speed roaming method of a wireless LAN according to claim 7, wherein
said mobile terminal is connected to said access point having a best communication situation, by scanning all connectable access points out of said access points provided in the network at a rising time.

15. The high-speed roaming method of a wireless LAN according to claim 8, wherein
said mobile terminal is connected to said access point having a best communication situation, by scanning all connectable access points out of said access points provided in the network at a rising time.

16. The high-speed warning method of a wireless LAN according to claim 3, wherein said backup access point comprises:
an access point having a smallest hopping set number.

17. The high-speed roaming method of a wireless LAN according to claim 3, wherein said backup access point is set based on a set alias name.

18. The high-speed roaming method of a wireless LAN according to claim 3, wherein said backup access point is set based on a MAC identification.

19. The high-speed roaming method of a wireless LAN according to claim 1, wherein said mobile terminal monitors said radio beacons to mate with the hopping information of the neighboring access point since said access points are operated synchronously.

20. The high-speed roaming method of a wireless LAN according to claim 1, wherein said mobile terminal fits a hopping channel and a hopping pattern to one the neighboring access point having the best radio situation.

21. The high-speed roaming method of a wireless LAN according to claim 19, wherein said mobile terminal transmits a probe request frame.

22. The high-speed roaming method of a wireless LAN according to claim 21, wherein said mobile terminal receives a probe response frame from said neighboring access point having the best radio situation.

23. The high-speed roaming method of a wireless LAN according to claim 22, wherein said mobile terminal decides the neighboring access point having the best radio situation and transmits an authentication request frame to the neighboring access point having the best radio situation.

* * * * *